United States Patent
Bear et al.

(10) Patent No.: US 7,443,971 B2
(45) Date of Patent: Oct. 28, 2008

(54) COMPUTER SYSTEM WITH DO NOT DISTURB SYSTEM AND METHOD

(75) Inventors: Eric Gould Bear, Bellevue, WA (US); Chad Magendanz, Issaquah, WA (US); Aditha May Adams, Seattle, WA (US); Carl Ledbetter, Mercer Island, WA (US); Steve Kaneko, Medina, WA (US); Dale C. Crosier, Kirkland, WA (US); Robert Scott Plank, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 971 days.

(21) Appl. No.: 10/429,903

(22) Filed: May 5, 2003

(65) Prior Publication Data

US 2004/0223599 A1 Nov. 11, 2004

(51) Int. Cl.
*H04M 3/42* (2006.01)
(52) U.S. Cl. ............................. 379/210.01; 379/211.01; 379/211.02; 379/215.01; 379/908
(58) Field of Classification Search ............ 379/210.01, 379/211.01, 211.02, 215.01, 908
See application file for complete search history.

(56) References Cited

U.S. PATENT DOCUMENTS

| | | | |
|---|---|---|---|
| 4,860,342 A | 8/1989 | Danner | |
| 5,159,445 A | 10/1992 | Gitlin | |
| 5,412,417 A | 5/1995 | Tozuka | |
| 5,487,181 A | 1/1996 | Dailey | |
| 5,519,722 A | 5/1996 | Akman | |
| 5,533,115 A | 7/1996 | Hollenbach | |
| 5,546,538 A | 8/1996 | Cobbley | |
| 5,568,540 A | 10/1996 | Grecko | 379/88.25 |
| 5,657,414 A | 8/1997 | Lett | |
| 5,675,374 A | 10/1997 | Kohda | 348/14.1 |
| 5,675,810 A | 10/1997 | Sellers | |
| 5,768,164 A | 6/1998 | Hollon | |
| 5,802,305 A | 9/1998 | McKaughan | |
| 5,959,622 A | 9/1999 | Greer | |

(Continued)

FOREIGN PATENT DOCUMENTS

EP 0772327 A2 5/1997

(Continued)

OTHER PUBLICATIONS

Anonymous, International Search Report in Corresponding EP Application No. EP 04 00 9868.

(Continued)

*Primary Examiner*—Quynh H Nguyen
(74) *Attorney, Agent, or Firm*—Workman Nydegger

(57) ABSTRACT

A do not disturb system and method in a computer system at which communications such as voice calls and text messages are received. A user or process may set a computer system into a do not disturb mode, in which any communication routed through the machine will be evaluated against a set of rules to determine how that communication is to be handled, based on criteria such as the source of the communication and the type of communication. A notification and outgoing action is selected and performed in accordance with user-configurable settings. The outgoing action may include a return communication to the source of the communication indicating that the do not disturb mode is in effect.

40 Claims, 13 Drawing Sheets

U.S. PATENT DOCUMENTS

| | | | |
|---|---|---|---|
| 5,999,613 A * | 12/1999 | Nabkel et al. | 379/215.01 |
| 6,006,285 A | 12/1999 | Jacobs | |
| 6,052,442 A | 4/2000 | Cooper et al. | 379/88.19 |
| 6,101,610 A | 8/2000 | Beebe | |
| 6,144,363 A | 11/2000 | Alloul | 345/618 |
| 6,144,644 A * | 11/2000 | Bajzath et al. | 370/259 |
| 6,172,703 B1 | 1/2001 | Lee | 348/14.08 |
| 6,208,373 B1 | 3/2001 | Fong et al. | 348/14.16 |
| 6,215,420 B1 | 4/2001 | Harrison et al. | 341/22 |
| 6,237,846 B1 | 5/2001 | Lowell | |
| 6,240,168 B1 | 5/2001 | Stanford et al. | |
| 6,266,714 B1 | 7/2001 | Jacobs | |
| 6,279,056 B1 | 8/2001 | Jacobs | |
| 6,282,435 B1 | 8/2001 | Wagner et al. | 455/566 |
| 6,346,934 B1 | 2/2002 | Wugofski | 345/158 |
| 6,362,440 B1 | 3/2002 | Karidis | |
| 6,380,968 B1 | 4/2002 | Alexander | |
| 6,417,849 B2 | 7/2002 | Lefebvre | |
| 6,438,585 B2 | 8/2002 | Mousseau | |
| 6,453,027 B1 | 9/2002 | Kang | |
| 6,483,905 B1 | 11/2002 | Kikinis | 379/93.24 |
| 6,507,356 B1 | 1/2003 | Jackel et al. | 348/14.06 |
| 6,513,128 B1 | 1/2003 | Wang | |
| 6,518,957 B1 | 2/2003 | Lehtinen et al. | |
| 6,519,335 B1 * | 2/2003 | Bushnell | 379/215.01 |
| 6,546,262 B1 | 4/2003 | Freadman | |
| 6,603,855 B1 | 8/2003 | Cannon et al. | |
| 6,628,194 B1 | 9/2003 | Hellebust | 340/7.5 |
| 6,628,267 B2 | 9/2003 | Karidis | |
| 6,658,095 B1 * | 12/2003 | Yoakum et al. | 379/93.01 |
| 6,671,356 B2 | 12/2003 | Lewis | 379/88.13 |
| 6,671,743 B1 | 12/2003 | Verity | 709/321 |
| 6,680,845 B2 | 1/2004 | Agata | |
| 6,691,233 B1 | 2/2004 | Gannage | |
| 6,718,183 B1 | 4/2004 | Blust | |
| 6,731,316 B2 | 5/2004 | Herigstad et al. | 715/864 |
| 6,741,232 B1 | 5/2004 | Siedlikowski | 345/156 |
| 6,757,372 B1 | 6/2004 | Dunlap et al. | 379/142 |
| 6,806,867 B1 | 10/2004 | Arruda | |
| 6,819,961 B2 | 11/2004 | Jacobs | |
| 6,831,657 B2 | 12/2004 | Tsutsumi et al. | 345/589 |
| 6,882,326 B2 | 4/2005 | Hirayama | 345/1.1 |
| 6,888,562 B2 | 5/2005 | Rambo et al. | 348/14.16 |
| 6,892,074 B2 | 5/2005 | Tarkiainen | 455/466 |
| 6,897,851 B2 | 5/2005 | Carini | |
| 6,902,332 B2 | 6/2005 | McLoone | 400/472 |
| 6,912,283 B2 | 6/2005 | Meyerson et al. | 379/428.04 |
| 6,937,950 B2 | 8/2005 | Cragun | |
| 6,938,174 B2 | 8/2005 | LeKuch | |
| 6,970,556 B2 | 11/2005 | Wall et al. | 379/355.01 |
| 6,973,167 B2 | 12/2005 | Kikinis | 379/67.1 |
| 6,976,216 B1 | 12/2005 | Peskin et al. | 715/716 |
| 6,980,641 B1 | 12/2005 | Stanford et al. | 379/387 |
| 6,996,445 B1 | 2/2006 | Kamijo | 700/94 |
| 7,036,110 B2 | 4/2006 | Jeyaraman | |
| 7,096,391 B2 | 8/2006 | Johnson | |
| 7,123,370 B2 | 10/2006 | Watanabe | |
| 7,221,331 B2 | 5/2007 | Bear | |
| 7,231,229 B1 | 6/2007 | Hawkins | |
| 7,243,130 B2 | 7/2007 | Horvitz | |
| 7,272,660 B1 | 9/2007 | Powers | |
| 7,302,637 B1 | 11/2007 | Maguire | |
| 2001/0040551 A1 | 11/2001 | Yates et al. | 345/156 |
| 2002/0015020 A1 | 2/2002 | Mobin | 345/156 |
| 2002/0080967 A1 | 6/2002 | Abdo | |
| 2002/0087225 A1 | 7/2002 | Howard | |
| 2002/0131072 A1 | 9/2002 | Jackson | |
| 2002/0167458 A1 | 11/2002 | Baudisch | |
| 2002/0167460 A1 | 11/2002 | Baudisch | |
| 2003/0021290 A1 | 1/2003 | Jones | 370/466 |
| 2003/0025674 A1 | 2/2003 | Watanabe | |
| 2003/0037180 A1 | 2/2003 | Madineni et al. | 709/321 |
| 2003/0069689 A1 | 4/2003 | Ibara | |
| 2003/0074590 A1 | 4/2003 | Fogle | |
| 2003/0112325 A1 | 6/2003 | Boyden et al. | 348/14.16 |
| 2003/0122874 A1 | 7/2003 | Dieberger | |
| 2003/0131148 A1 | 7/2003 | Kelley et al. | 717/101 |
| 2003/0146903 A1 | 8/2003 | Yi | |
| 2003/0188041 A1 | 10/2003 | Fillmore | |
| 2003/0197685 A1 | 10/2003 | Yi | |
| 2003/0227471 A1 | 12/2003 | Eglit | |
| 2004/0114032 A1 | 6/2004 | Kakii | 348/14.08 |
| 2004/0135819 A1 | 7/2004 | Maa | |
| 2004/0141012 A1 | 7/2004 | Tootill | 345/827 |
| 2004/0155956 A1 | 8/2004 | Libbey | 348/14.16 |
| 2004/0177361 A1 | 9/2004 | Bernhard et al. | 719/321 |
| 2004/0222977 A1 | 11/2004 | Bear | 340/815.4 |
| 2004/0222978 A1 | 11/2004 | Bear | 345/172 |
| 2004/0223058 A1 | 11/2004 | Richter | |
| 2004/0223061 A1 | 11/2004 | Bear | 348/207.1 |
| 2004/0223599 A1 | 11/2004 | Bear | 379/215.01 |
| 2004/0225502 A1 | 11/2004 | Bear | 704/270 |
| 2004/0225892 A1 | 11/2004 | Bear | 726/2 |
| 2004/0225901 A1 | 11/2004 | Bear | 713/300 |
| 2004/0240167 A1 | 12/2004 | Ledbetter et al. | 361/683 |
| 2004/0240650 A1 | 12/2004 | Bear | 455/426.1 |
| 2005/0068423 A1 | 3/2005 | Bear | 345/156 |
| 2005/0069101 A1 | 3/2005 | Bear | 379/90.01 |
| 2005/0071437 A1 | 3/2005 | Bear | 713/1 |
| 2005/0071626 A1 | 3/2005 | Bear | 713/1 |
| 2005/0182822 A1 | 8/2005 | Daniel | |
| 2005/0186942 A1 | 8/2005 | Griffin | |
| 2005/0193396 A1 | 9/2005 | Stafford-Fraser | |
| 2006/0007051 A1 | 1/2006 | Bear | 345/1.1 |
| 2006/0048062 A1 | 3/2006 | Adamson | |
| 2006/0061516 A1 | 3/2006 | Campbell | |
| 2006/0095525 A1 | 5/2006 | Mousaeau | |
| 2006/0130075 A1 | 6/2006 | Rhoten | 719/328 |
| 2006/0164324 A1 | 7/2006 | Polivy | 709/206 |
| 2006/0284787 A1 | 12/2006 | Bear | |

FOREIGN PATENT DOCUMENTS

| | | |
|---|---|---|
| EP | 0777394 A1 | 6/1997 |
| EP | 000816990 | 1/1998 |
| EP | 0838934 A1 | 4/1998 |
| EP | 0772327 A3 | 2/1999 |
| WO | WO9602049 A1 | 1/1996 |

OTHER PUBLICATIONS

U.S. Appl. No. 11/509,437, filed Aug. 23, 2006, Bear.
U.S. Appl. No. 11/559,821, filed Nov. 14, 2006, Bear.
U.S. Appl. No. 11/685,014, filed Mar. 12, 2007, Bear.
U.S. Appl. No. 11/837,302, filed Aug. 10, 2007, Bear.
Oxford On-Line Dictionary, http://dictionary.oed.com/entrance.dtl, Oxford University Press 2007, on the definition of the word "physical" under 111/7b.
Office Action dated Aug. 8, 2007 cited in related U.S. Appl. No. 10/996,371 (Copy Attached).
Office Action dated Jul. 31, 2007 cited in related U.S. Appl. No. 10/677,084 (Copy Attached).
Office Action dated Jul. 27, 2007 cited in related U.S. Appl. No. 10/996,557 (Copy Attached).
Office Action dated Jul. 30, 2007 cited in related U.S. Appl. No. 10/430,369 (Copy Attached).
Office Action dated Jul. 6, 2007 cited in related U.S. Appl. No. 10/429,943.
Office Action dated Sep. 24, 2007 cited in related U.S. Appl. No. 10/429.,931
Office Action dated Sep. 24, 2007 cited in related U.S. Appl. No. 10/429,933.
Office Action dated Feb. 15, 2007 cited in related U.S. Appl. No. 10/429,933.

Notice of Allowance dated Jan. 30, 2008 cited in related U.S. Appl. No. 10/429,931.
Office Action dated Mar. 21, 2008 cited in related U.S. Appl. No. 10/966,557.
Office Action dated Feb. 28, 2008 cited in related U.S. Appl. No. 10/966,371.
Office Action dated Sep. 28, 2007 cited in related U.S. Appl. No. 10/429,943.
Office Action dated Mar. 26, 2008 cited in related U.S. Appl. No. 10/428,943.
Office Action dated Mar. 18, 2008 cited in related U.S. Appl. No. 10/677,118.
Notice of Allowance dated Apr. 23, 2008 cited in related U.S. Appl. No. 10/430,369.
Office Action dated Jan. 11, 2008 cited in related U.S. Appl. No. 10/677,084.
Notice of Allowance dated Apr. 29, 2008 cited in related U.S. Appl. No. 10/677,084.

* cited by examiner

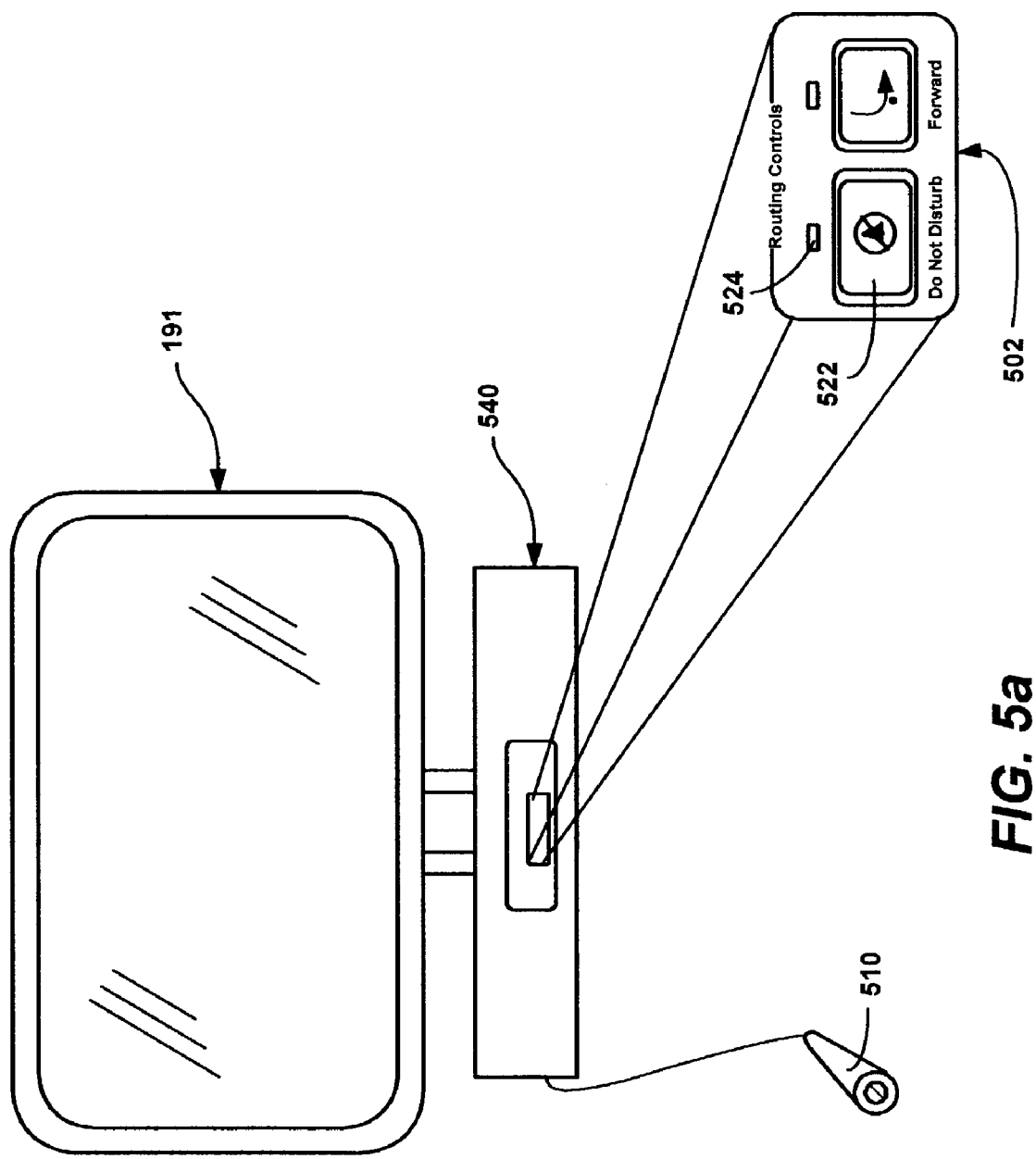

COMPUTER SYSTEM WITH DO NOT DISTURB SYSTEM AND METHOD

CROSS-REFERENCE TO RELATED APPLICATIONS

The present invention is related to the following copending U.S. patent applications filed concurrently herewith, assigned to the assignee of the present invention, and hereby incorporated by reference in their entireties:
"Method and System for Auxiliary Display of Information for a Computing Device," Ser. No. 10/429,932;
"Real-Time Communications Architecture and Methods for use with a Personal Computer System," Ser. No. 10/129,905;
"Record Button on a Computer System," Ser. No. 10/429,904;
"Method and System for Auxiliary Processing Of Information for a Computing Device," Ser. No. 10/429,930;
"System and Method for Activating a Computer System;" Ser. No. 10/430,369;
"Computer Camera System and Method for Reducing Parallax," Ser. No. 10/429,943;
"Control and Communications Panel for a Computer System," Ser. No. 10/429,933; and
"Notification Lights, Locations and Rules for a Computer System," Ser. No. 10/429,931.

FIELD OF THE INVENTION

The invention relates generally to computer systems and communications.

BACKGROUND OF THE INVENTION

People communicate in many ways over many types of devices and channels, including by voice, by audio/video, and by text or the like. Voice communications include audio over landline telephones such as connected to POTS (plain old telephone service) lines or PBX (private branch exchange) lines, and cellular and satellite telephones, as well as voice over Internet Protocol (VoIP). Audiovisual communications include video tele-conference (VTC), which also may be Internet Protocol-based communication. Text communications include electronic mail, instant messaging, pagers with text messaging, and so forth.

Some contemporary devices provide multiple ways to communicate, e.g., pocket sized personal computers may have a cellular telephone connection to place audio calls, and a wireless internet connection for sending and receiving electronic mail messages and instant messaging communications. Some mobile devices (e.g., a Smartphone) are considered to be more like telephones, but likewise provide Internet access, and may handle text messaging generally.

One problem with any communications device is that users do not necessarily want to receive communications all the time. For example, in the past when telephone was the main (or only practical) way to reach someone remotely, a telephone user in an important client meeting would tell a receptionist to "hold my calls" in order to avoid being interrupted. Some contemporary telephone systems provide a "do not disturb" feature that essentially does the same thing, such as to route any incoming calls to a voicemail system.

While this is beneficial for telephone calls, such an automatic do not disturb feature does not help with other types of communications that can be similarly distracting. For example, a visible notification may appear on a user's main display screen when an email message is received. Further, the conventional do not disturb feature on a telephone is little more than a switching mechanism that does not discriminate based on the source of the call, take action based on the type of call, or perform other operations that are more intelligent with respect to how an incoming communication is handled, that is, in a way that resembles how a human receptionist might act given the same communication.

What is needed is an automated do not disturb system and related methods for handling contemporary communications in a computer system. The system and method should operate in what is perceived to be an intelligent manner, and be fairly comprehensive in handling communications, as well as flexible and extensible to handle many user scenarios and usage patterns. At the same time, the do not disturb system and method should be straightforward for users to implement and activate.

SUMMARY OF THE INVENTION

Briefly, the present invention provides a do not disturb system and method in a computer system at which communications are received. Communications may include virtually any kind of notifications over which a computer system may have some control, including audio over landline telephones such as connected to POTS (plain old telephone service) lines or PBX (private branch exchange) lines, and cellular and satellite telephones, as well as voice over Internet Protocol (VoIP). Audiovisual communications include video tele-conference (VTC), which also may be Internet Protocol-based communication. Text (whether actual text, handwriting or some other human-perceptible format) communications include electronic mail, instant messaging, pagers with text messaging, subscription-based messages such as stock quotes and so forth.

A user may set a computer system into a do not disturb mode by pressing a button such as on a keyboard or on the machine, by setting other physical state such as closing an office door, or by clicking on a user interface of an appropriate software program. The mode may also be entered by an automated process, such as at a scheduled certain time. While in this do not disturb mode, any communication routed through the machine will be evaluated against a set of rules to determine how that communication is to be handled, based on criteria such as the source of the communication (e.g., the caller or sender's identity), the type of communication (e.g., voice or text, and possibly accompanying priority data), and possibly other criteria, such as a level of do not disturb, time-of-day and so forth. Based on the rules versus such criteria, an action comprising a notification and outgoing action is selected, such as via a database lookup and/or applying rules to the criteria.

The action may range from no notification whatsoever for anyone, to limited notifications for certain users and/or types of messages, to full notifications when certain rules are met. Notifications may include any audible, visual or tactile feedback. The rules may be set to include or exclude any particular communicant or group of communicants, and/or any communications types. For example, a rule and action may be set up to block all incoming phone calls based on received caller ID information, except calls from a family member or the user's supervisor, and then only provide a visual notification by flashing an LED and showing the caller ID data. The visual notification need not be on the user's main display screen.

The resultant action taken in response to a communication may include sending a return communication back to the caller or sender. The return communication need not be of the same type as the incoming call or message. For example, an email message, instant message or some other visual notification may be returned to a voice caller indicating that the do not disturb mode is in effect at the recipient's computer, which acts as the center for communications. In the event that the caller ID and/or other information from that call is known, possibly including preset knowledge such as that the incoming telephone number belongs to a mobile device, the output can be adjusted as appropriate, e.g., although a text message should be sent, the text message may be converted to speech to leave a voice message when the call was known to be from a source with indeterminate technological capabilities, such as from a mobile phone that may not handle text, or when the caller is known to be traveling.

In addition to providing an indication to the user, such as lighting an LED proximate the do not disturb button, to remind the user that this mode is active, a publicly visible indicator such as a light atop a user's cubicle wall or by an office door may also communicate this information to others in advance. Colors and/or flash patterns may be varied to enhance visibility and/or indicate a do not disturb level, e.g., do not disturb at all, do not disturb unless very important, do not disturb unless specific clearance was previously given, and so forth. A broadcast message may be sent to selective others, such as to proactively notify other members of a work team of a user's do not disturb status before such disturbance is attempted.

Other advantages will become apparent from the following detailed description when taken in conjunction with the drawings, in which:

BRIEF DESCRIPTION OF THE DRAWINGS

FIG. 5a is a representation of a control panel positioned beneath a computer monitor and having a "do not disturb" button incorporated into the control panel, in accordance with an aspect of the present invention;

DETAILED DESCRIPTION

Exemplary Operating Environment

Figure 1:
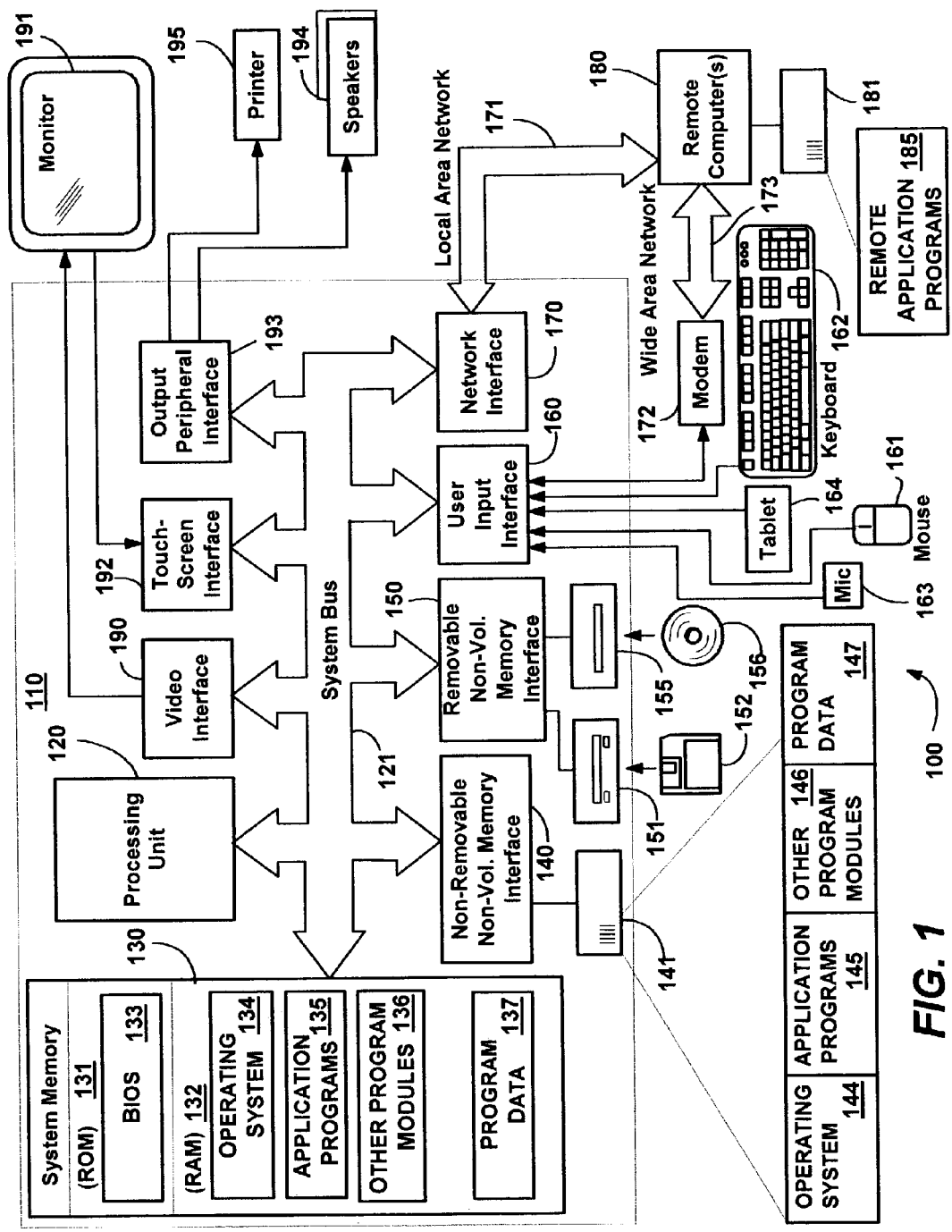
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose, or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Do Not Disturb Computing

The present invention is generally directed towards operating a computer system in a mode which intelligently routes, provides notifications for and otherwise appropriately handles communications and other notifications received at the computer. As such, the computer is generally arranged as a central communications point for multiple communications-related devices, such as generally described in the related copending U.S. patent application Ser. No. entitled "Real-Time Communications Architecture and Methods for use with a Personal Computer System." As will be understood, the various communication channels, devices and scenarios described herein are only examples, and there are many others to which the present invention will apply.

Figure 2:
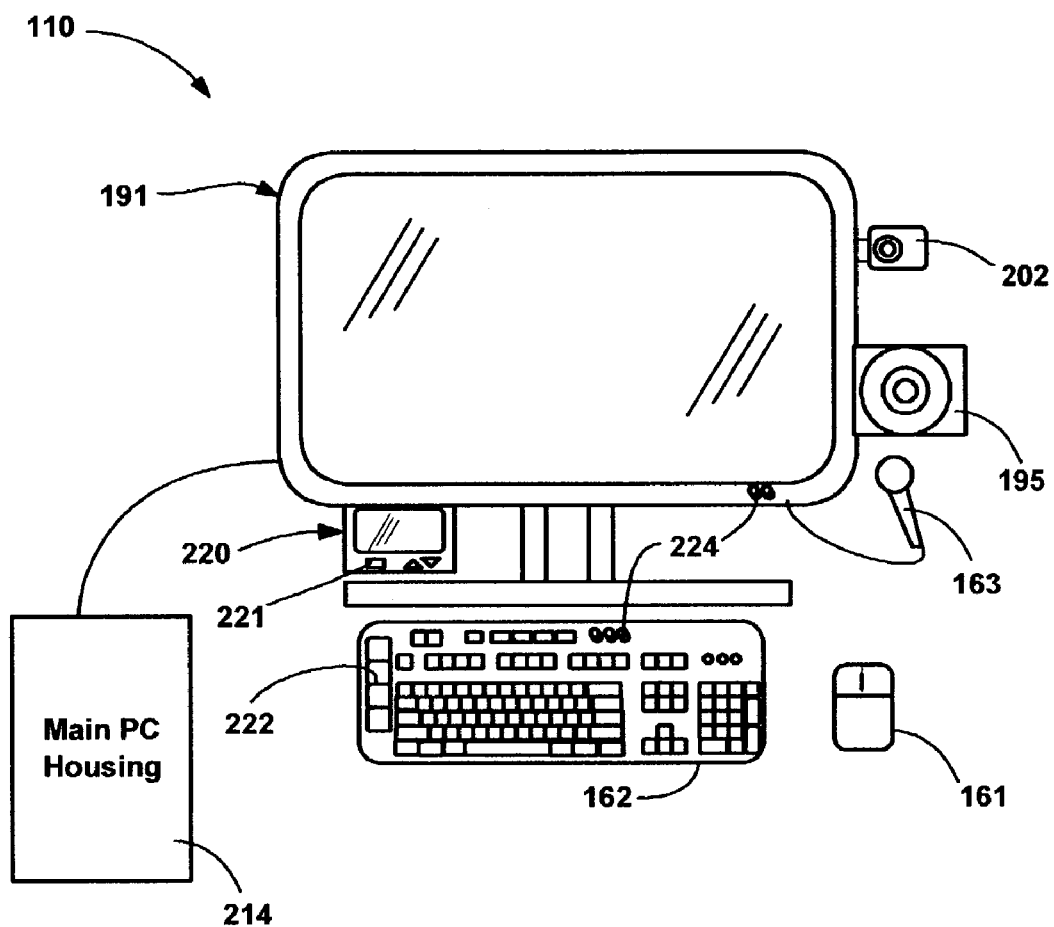
FIG. 2 is a general representation of a computer system arranged with communications-related do not disturb mechanism in accordance with an aspect of the present invention.

Turning to FIG. 2 of the drawings, there is shown a computer system, such as the computer system 110 of FIG. 1, in which various communications-related devices are integrated. For example, the computer system 110 includes a monitor 191 having an attached camera 202, an attached telephone (e.g., handset) 204, and an attached speaker 206, which along with a microphone 208, may function as a speakerphone. Other devices not separately represented in FIG. 2 include mobile communications devices such as a cellular telephone or other mobile computing device capable of connecting in some way (e.g., by wired cradle or Bluetooth™ technology) with the computer system. Although shown as individual devices in FIG. 2, it is understood that any or all of these devices, such as the speaker 195 and microphone 163, may be combined into a unitary assembly, or built into other devices, such as the monitor 191. In any event, each of these devices may be present and if so are connected directly or indirectly by a wired or wireless connection to interfaces at the main PC housing 214 (containing at least the motherboard, but also typically containing some non-volatile storage). As used herein, the term "connect" and its variants and "couple" are equivalent and generally mean that there is some type of information capable of being transferred between one entity and another, regardless of whether directly or indirectly via any intermediaries and/or any transformation of the information.

Also represented in FIG. 2 is an auxiliary display device 220, such as for displaying caller ID data or like information as described below. The auxiliary display 220 is typically small (relative to the main display screen 191), and may be the display of another device, such as the screen of a mobile computing device, but may also be a dedicated display, such as one that is operably coupled to the computer operating system when the computer system 110 is in a powered-up state. Further, note that the auxiliary display need not be an actual display, but can be a projection (e.g., onto a wall) of the information. The auxiliary display device 220 may provide some of its own processing and storage resources, so as to remain functional to some extent when the computer operating system is not running. The auxiliary display device 220 may also have its own controls 221 for interfacing therewith, possibly including controls that allow setting a do not disturb state. The keyboard 162 and/or monitor 191 (and/or possibly the pointing device 161) may also include non-conventional buttons 222, such as buttons related to controlling a do not disturb state with respect to real-time communications, and non-conventional LED indicators 224, such as indicators related to the do not disturb state.

Figure 3:
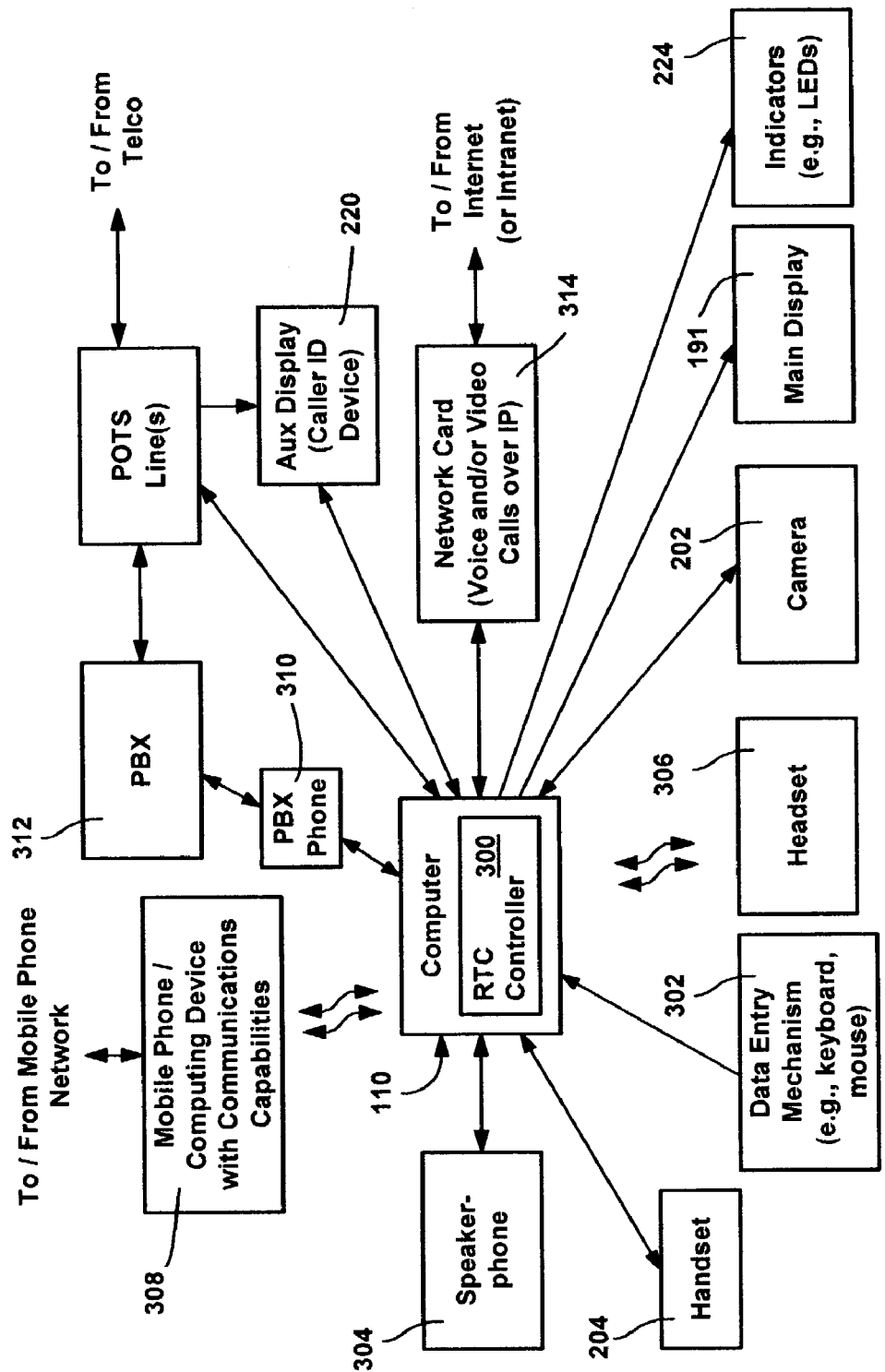
FIG. 3 is a block diagram generally representing the central control of communication devices and connections to communications channels, in accordance with an aspect of the present invention.

As generally represented in FIG. 3, the computer system 110 may include a real-time communications controller 300, primarily implemented in a software component or set of software components, that intelligently handles various aspects of a user's real-time communication needs, including facilitating communications in general, and also handling do not disturb operations. Note that the real-time communications controller 300 need not be built into the computer system 110, but can connect thereto as an add-on device, such as via a USB connection.

To handle a user's various communications needs, the real-time communications controller 300 allows a user to connect to various communication channels (e.g., a telephone company switching network, a mobile phone network, the internet or an intranet, and virtually any other local area or wide area network over which communication is possible) using the various communications-related data input/output devices. In general, the user is able to input data via any input mechanism, e.g., any microphone on any device, via any text or pointing-based user data entry mechanism 302 such as the keyboard and/or mouse, and/or the camera 202, and have that data configured as appropriate (e.g., converted from speech to text) and sent to an appropriate (one or possibly more) of the available communication channels. Similarly, the real-time communications controller 300 is able to receive data and output appropriate data to the user on any one or more of the output mechanisms, such as the speaker of a speakerphone 304 when the user has selected that device, the handset telephone 204 when lifted, a headset 306 if activated, the mobile phone or similar computing device 308 if selected, a PBX phone 310 connected to a PBX mechanism 312 and/or a network card 314. When video, graphical and/or text information is available, data can also be displayed on the main display 191 (if active), and/or the auxiliary display 220. Note that some of the devices are represented in FIG. 3 as directly connected to the computer system while other are shown as being wireless, however it is understood that any device may be wired or wireless, e.g., a typical mobile computing device or mobile telephone may be cradled and thus "wired" to the computer, and/or may integrate a cellular phone, Wireless Ethernet (also known as 802.11b or Wi-Fi), and/or Bluetooth™ wireless technology.

In accordance with an aspect of the present invention, the real-time communications controller 300 controls various communication modes for the user, including the do not disturb mode. To enter this mode, the user can interact with the computer via software, e.g., by pointing and clicking on an a user interface component of an application or operating system program. Alternatively, a more straightforward way for a user to enter a do not disturb mode is by actuation of a hardware button (term button used loosely to indicate one of a variety of available switch types), such as represented in FIGS. 4-6.

Figure 4:
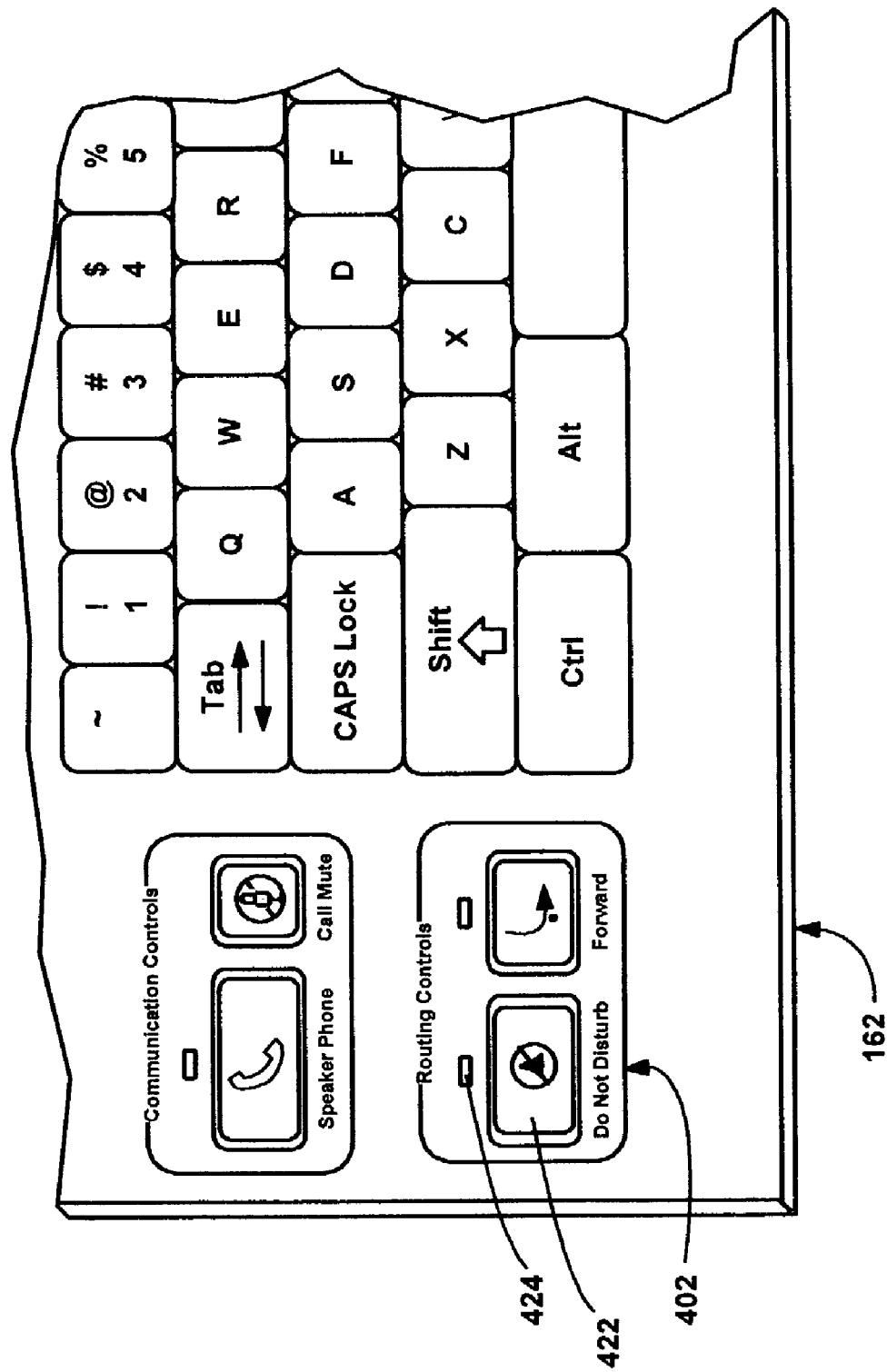
FIG. 4 is a general representation of a partial keyboard including a "do not disturb" button incorporated into the keyboard, in accordance with an aspect of the present invention.

For example, in one alternative implementation generally represented in FIG. 4, the computer system 110 includes the do not disturb button 422 among keyboard-based keys and other controls such as among routing controls 402 on the keyboard 162. As shown in FIG. 4, a do not disturb indicator 424 may comprise an external indicator, e.g., an LED above the do not disturb button 422 or located elsewhere. In general, the do not disturb indicator 424 should be close to the do not disturb button 422, so that the user sees it when pressing the do not disturb button 422, but may be positioned (and/or duplicated in some appropriate location) so as to enhance its visibility. Note that although not shown, the do not disturb indicator may be incorporated into the do not disturb button.

Figure 5B:
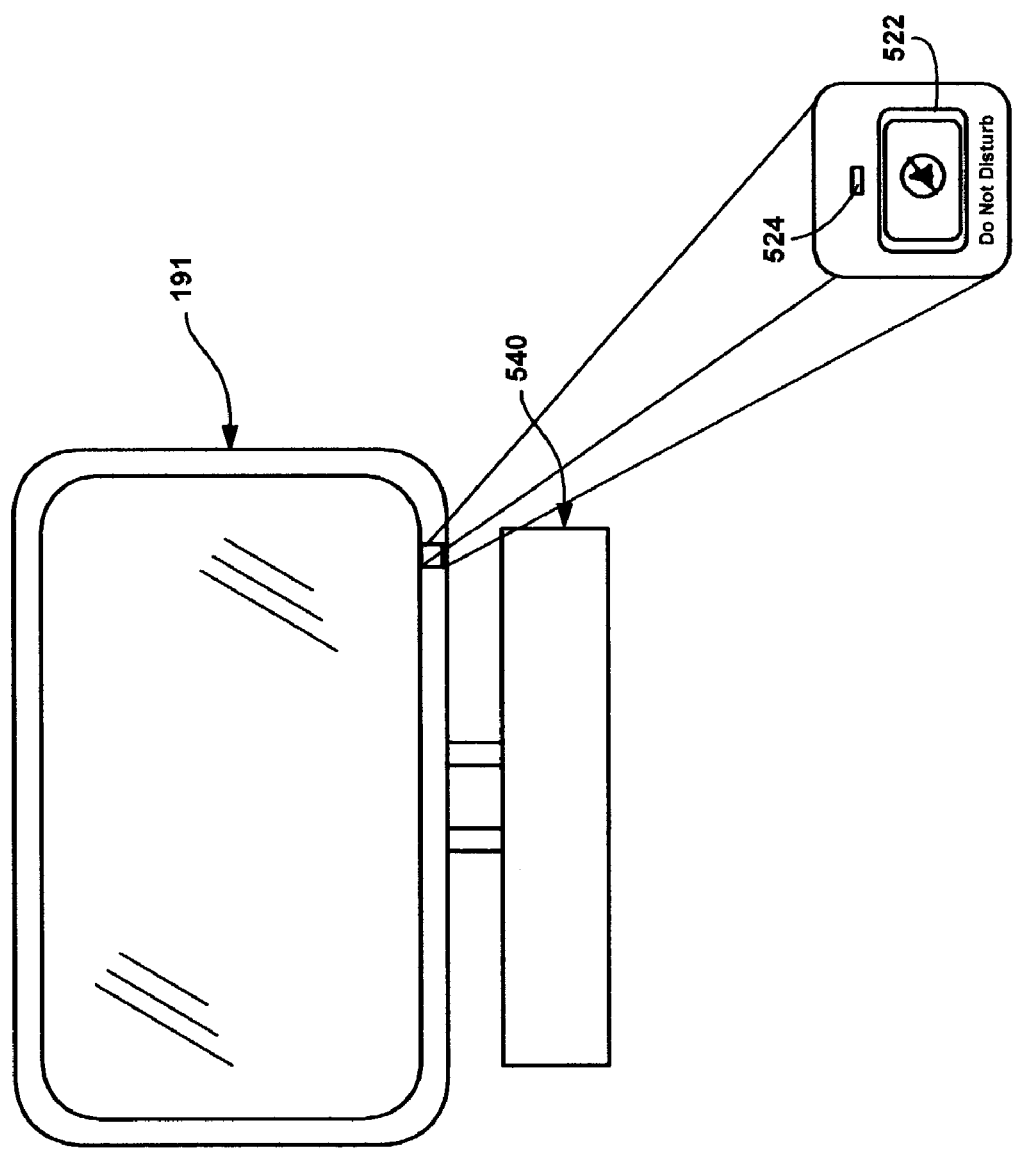
FIG. 5b is a representation of a "do not disturb" button incorporated into the monitor, in accordance with an aspect of the present invention.
Figure 5C:
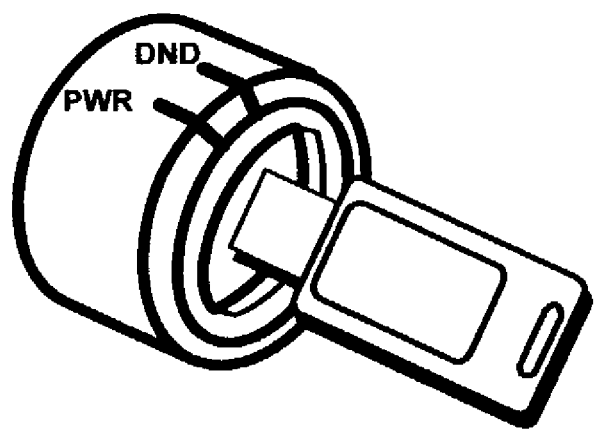
FIG. 5c is a representation of a "do not disturb" activation device, in accordance with an aspect of the present invention.

FIGS. 5a and 5b show alternative arrangements, with the do not disturb button 522 again provided among routing controls 502 in FIG. 5a, or by itself in FIG. 5b, shown magnified in FIGS. 5a and 5b. In FIG. 5a, a control panel 540 is shown as being attached to or underneath the main display 191, which provides very good visibility of the do not disturb light 524, but it may not be as convenient for the user to press the do not disturb button 522 (as compared to pressing one on a keyboard as in FIG. 4). In FIG. 5b, the do not disturb button 522 is on the monitor bezel. A wired or wireless do not disturb button 510 such as constructed to be held by a user, may also be provided. FIG. 5c provides an activation mechanism, or switch, that allows a user to control the do not disturb state like an ignition key.

Figure 6:
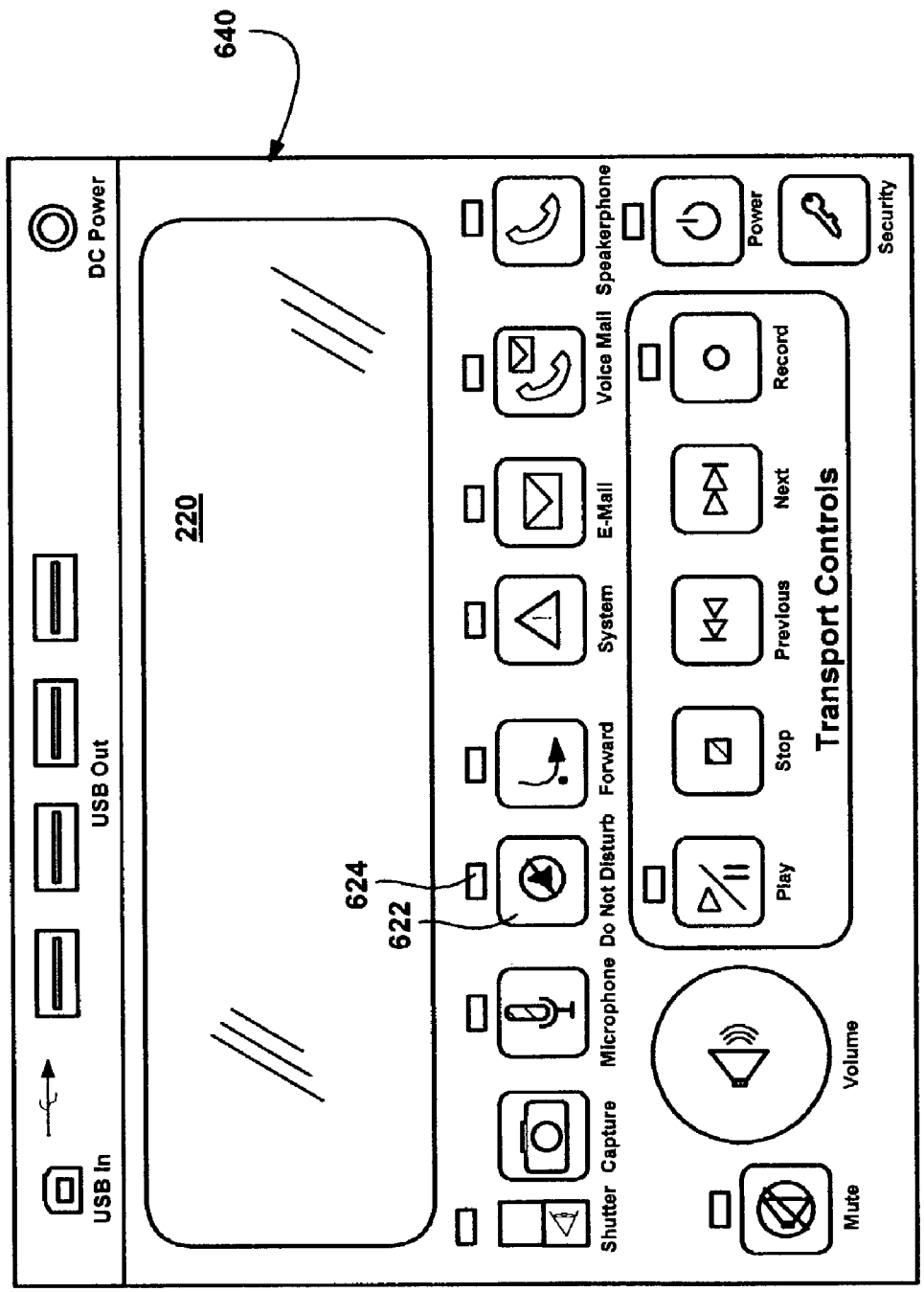
FIG. 6 is a representation of an alternative control panel having "do not disturb" button in accordance with an aspect of the present invention.

FIG. 6 provides an alternative control panel 640 including an auxiliary display 220. In FIG. 6, the do not disturb button 622 is shown as not being grouped (except by general location) with any other button, to exemplify the various ways in which a do not disturb button 622 may be presented. Thus, the do not disturb button 622 need not be grouped with one or more other routing controls, but may be grouped with some other set of buttons, or may be an independent button. In fact, the do not disturb button may be placed on a microphone, headset, handset, and so forth, and/or may be an add-on to a computer system, such as by providing a button (such as the button 610 in FIG. 6) that connects to a USB or infrared port, or a as a Bluetooth™ device or other wired or wireless connection.

Figure 7:
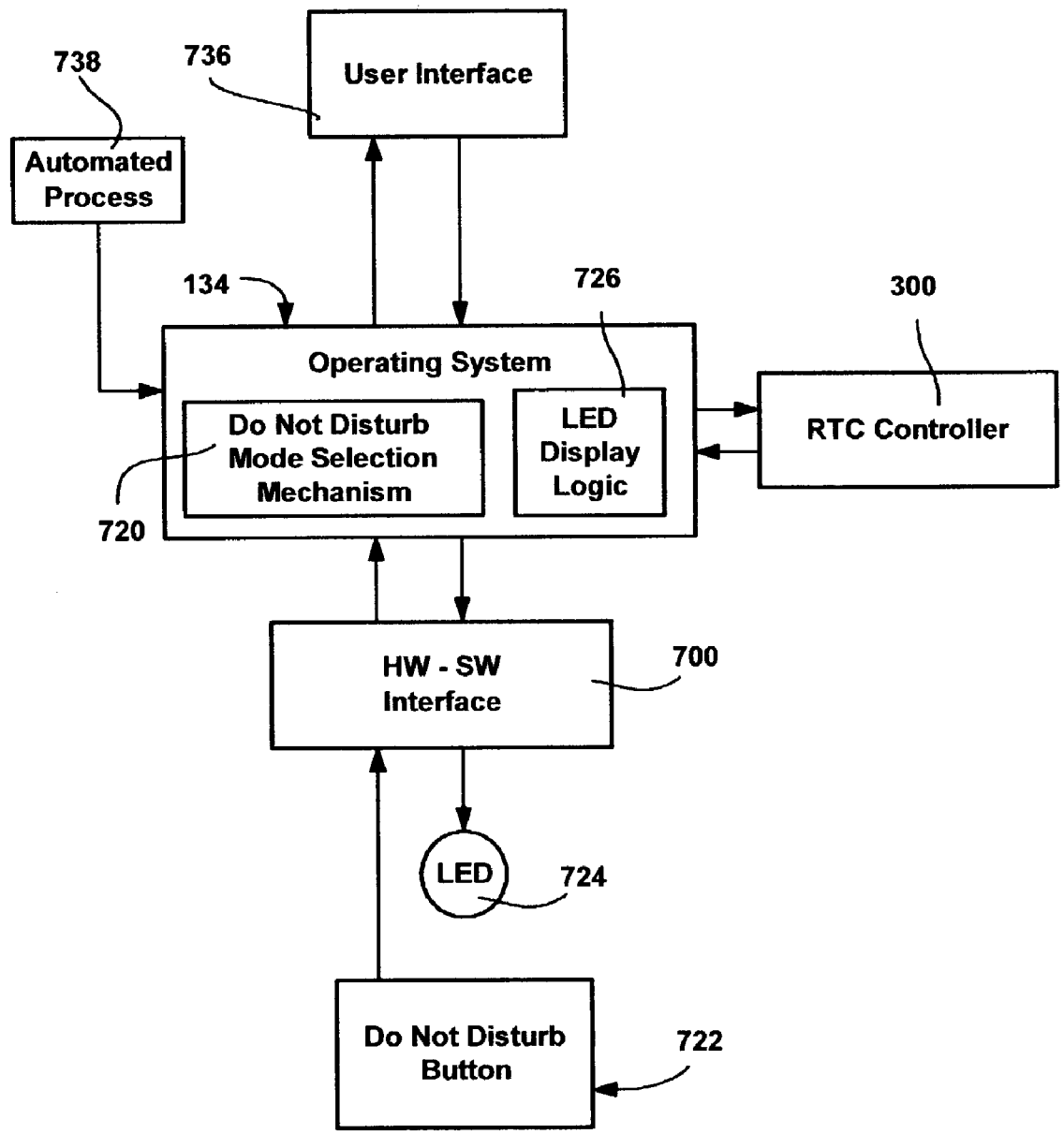
FIG. 7 is a block diagram generally representing components to respond to a do not disturb button and control and display the do not disturb state in accordance with an aspect of the present invention.

Turning to an explanation of the use of a do not disturb button 722, as generally represented in FIG. 7, the do not disturb button 722 operably connects through an appropriate hardware/software interface 700 to signal state data to the operating system 134. The operating system 134 in turn may interpret what the state means via a do not disturb mode selection mechanism 720, such as to determine an action to take based on the button, e.g., to turn on a do not disturb mode and filter and/or respond to communications, as described below, or let the communication notifications arrive in a normal state. Different actuation patterns may result in different levels of a do not disturb mode, as selected by the do not disturb mode selection mechanism 720.

A user interface 736 also may be used to select the do not disturb mode, as well as to configure the do not disturb rules and resultant actions. As described below, the RTC controller 300 includes logic for controlling what actions occur when communications are received with respect to a do not disturb operating state.

An automated process 738 also may be used to select the do not disturb mode. For example, a user may set up a schedule to select the do not disturb mode at the same hour every day, or whenever some other event occurs or is occurring, e.g., when on a video call the user may not want anything to disturb that call.

The operating system 134 may control the display of the indicator 724. For example, the do not disturb indicator 602 may be lit as steady amber when the do not disturb mode is active, although this may be configurable, e.g., by color-blind individuals. Other colors and/or patterns may indicate additional information to users, such as a level of a do not disturb mode, as described below.

By way of example, consider a "complete" do not disturb mode having no notifications whatsoever (as if the user shut off each telephone ringer and disconnected a network connection), versus a "standard" do not disturb mode in which visual indicators continue to function along with an auxiliary display to allow call screening, however no audible or modal alerts occur that distract the user's attention away from the main task at hand. An amber flashing pattern on the indicator 724 may indicate the "complete" do not disturb mode, while a steady amber light may indicate the "standard" mode. If audible notifications are allowed, ring patterns, tones and/or volume levels may vary based on the state of the do not disturb mode.

Figure 8:
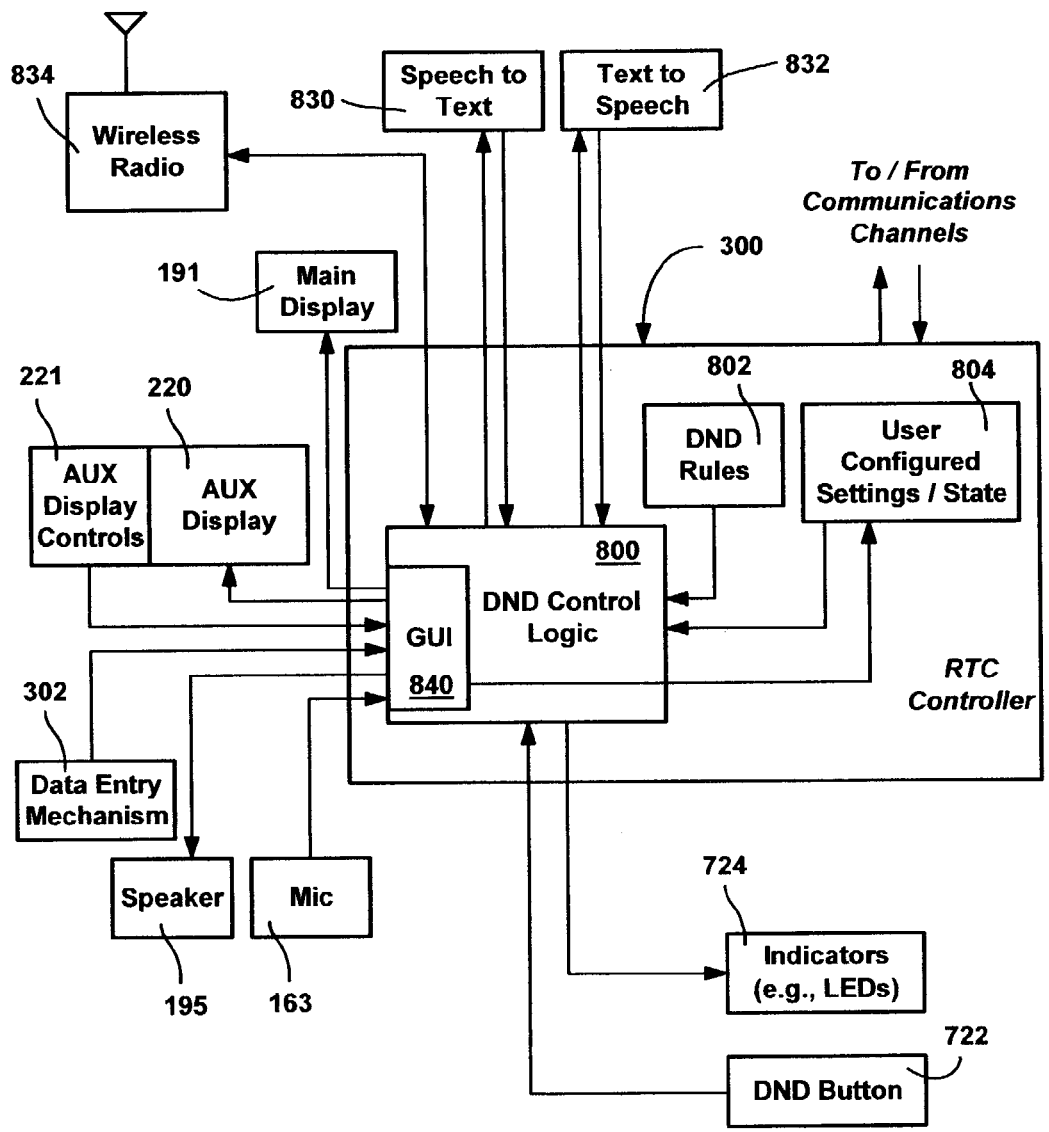
FIG. 8 is a block diagram generally representing components for configuring do not disturb settings and for entering a do not disturb state of operation in accordance with an aspect of the present invention.

As generally represented in FIG. 8, the do not disturb mode or modes and related operations are accomplished by responding to the user's selection, via do not disturb (DND) control logic 800 in the real-time communications controller 300 (FIG. 3) that follows various do not disturb rules 802 with respect to user-configurable settings and a current operating state 804. The DND control logic 800 likewise responds to external events, such as incoming calls, pages, text messages, forwarded voicemail messages, and so forth.

User actions can occur and be detected in any number of ways, including hardware button and software activation and deactivation of the do not disturb mode as described above. The present invention contemplates essentially any way of activating or changing the mode, such as by program, remote control, dial-up, audio commands and so on. User action information may also be communicated by wireless radio 834, and/or from a network connection or other communication channel. Motion and/or proximity sensing can likewise serve as a user action sensor, e.g., related to a user's presence.

Where appropriate, a graphical user interface component 840 shown as part of the DND control logic 800 (but possibly anywhere in the computer system, such as in another application program) may facilitate entry of the user action and do not disturb information. For example, the user may interact with a software program such as related to user contacts to set the variables for how communications received from that contact are handled in each mode. The user may also use the graphical user interface 840 to configure various do not disturb settings.

The present invention similarly outputs information to the user in any feasible manner, including via the user interface when appropriate. Essentially, anything capable of outputting something that can be sensed by a user can serve as an output mechanism, including the displays 191 and/or 220, lights and other indicators 224, the speaker 206 or other audio generating device such as a ringer on a cell phone, and other mechanisms such as one that provides tactile feedback (e.g., a vibrating cell phone). Thus, as used herein, the term "display" is only an example, and is not limited to visible information, but can include any sensed output including non-visual representations. For example, a tone and pattern can "display" communications-related information audibly.

In general, the DND logic 800 receives remotely communicated data (such as an incoming call), and based on various real-time do not disturb rules 802 and user configurable settings 804, responds in a proper manner. For example, for an incoming telephone or cellular call, the DND control logic 400 may display the caller ID information on the auxiliary display 220, or possibly the main display 191 if so configured by the user, flash an indicator but not sound a ring or call waiting tone on the speaker 206, and wait for a user action. If the user presses a phone control button such as a speakerphone button, the call will be connected to the appropriate device, e.g., routed to the speaker 206 and microphone 208. Any other audio, such as music that the user was listening to, may be automatically muted until the call is complete, e.g., until the user again presses the speakerphone button to disconnect. Otherwise the call may be responded to with an automatic action, such as providing a voice mail message and/or sending a text message.

Note that the return action may be specific to the do not disturb mode, (as opposed to a not answering or busy message), and need not be of the same type as the call. For example, a text message may respond to a voice call to indicate that the called party is present, but has requested privacy. In the event that the caller ID and/or other information from that call is known, possibly including preset knowledge such as that the incoming telephone number belongs to a mobile device, the output can be adjusted as appropriate, e.g., although a text message should be sent, the text message may be converted to speech (e.g., by a text to speech converter 832 of FIG. 8) to leave a voice message when the call was known to be from a phone that does not handle text, or when the caller is known to be traveling. Other actions may include automatically discarding a received message based on the rules, categorizing a message before storing it, forwarding the message or the call to another with a special do not disturb introductory message to the party to which the call is being forwarded, and so forth.

The present invention thus automatically and transparently responds in an appropriate and seemingly intelligent manner to a user's do not disturb needs. By way of example, consider the example above of a user who is working at the computer when a call comes in. Instead of simply sending the call to a recording, the DND control logic 800 analyzes the call data to figure out what type of call it is and who it is from, determines how (if at all) the user should be notified, and provides the notification. Further, the logic 800 determines whether to take an action, and if so, takes the action. With telephone and cellular calls, caller ID may be evaluated to determine the caller's identity, while instant messaging and email provide an identity for network-received messages. Unknown callers and unsolicited text messages may be filtered. However, the present invention is more than a conventional message filter, as it instead takes action to notify, preserve and/or discard incoming communications, and also to possibly automatically respond with an outgoing communication.

Figure 9:
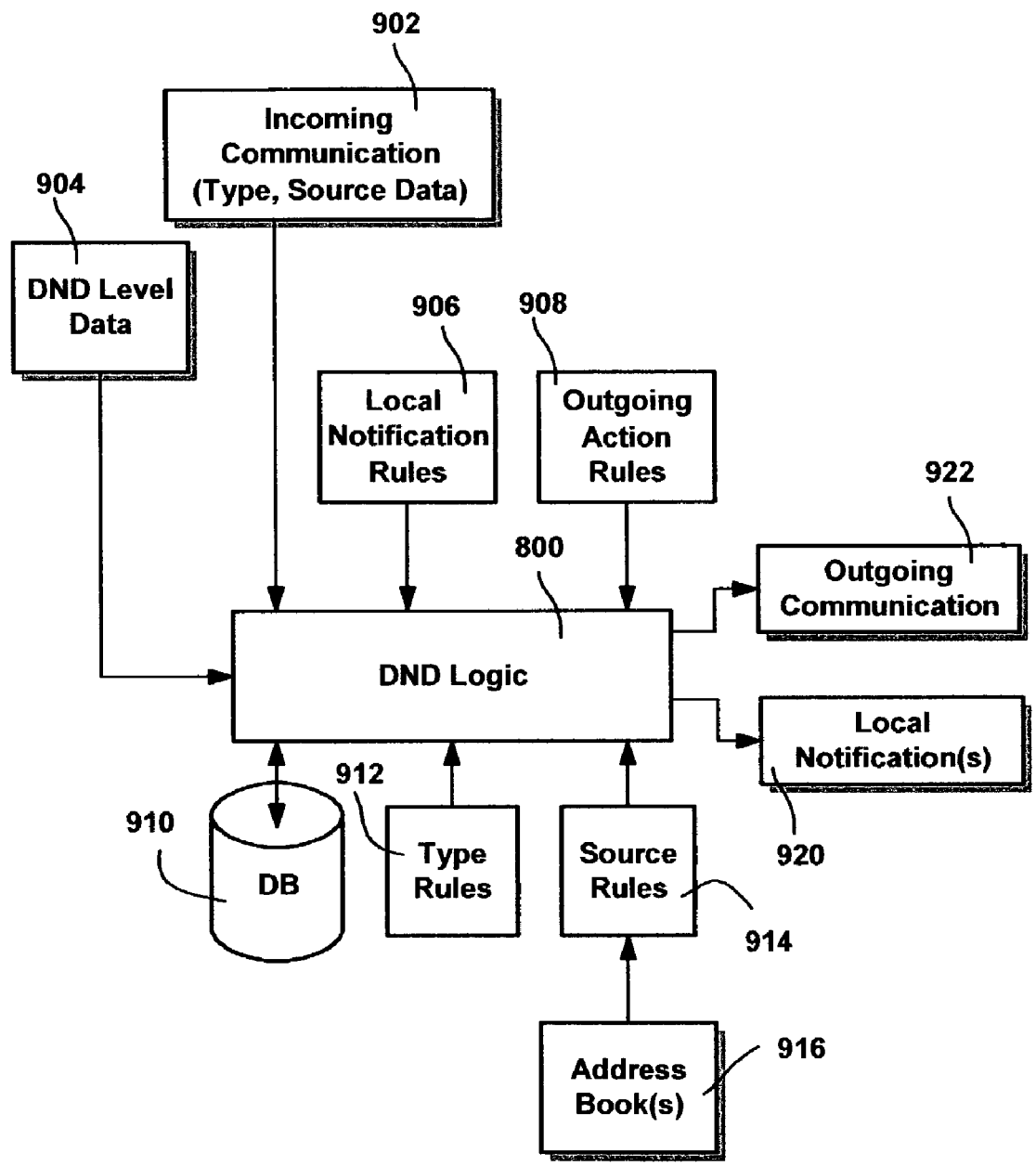
FIG. 9 is a block diagram generally representing components to control the operation of a computer system based on a do not disturb state in accordance with an aspect of the present invention.

FIG. 9 provides a block diagram representation of how the do not disturb (DND) logic 800 works when an incoming communication 902 is received. In general, the DND logic 800 determines a DND level (which may be zero, or off for example) from data 904, and, as necessary, uses the type of incoming data (e.g., voice call, video call, instant message, email message, or other notification) in data in conjunction with the source of the communication (an identifier of who called or sent the message) to take an action.

The DND logic 800 accesses local notification rules 906 to determine how the user should be notified, (if at all), while outgoing action rules 908 determine what information (if any) will be returned to the other communicating party. A lookup (or lookups) in a database 910, using the caller/sender and the type of call/message as keys, may be one way to obtain the appropriate rules. Note that within types of messages such as email messages, subtypes such as high priority, regular priority and low priority may be used as search keys and/or criteria so as to be assigned their own rules and actions. Other factors such as a DND level 904 (which may vary by time of day, a time out operation and so forth) may be used as part of a search key.

Note that not all type rules and source rules may be contained in the database 910. For example, the user may set special exceptions that may be used before searching the database (or to override or supplement a database result). In this manner, for example, the normal database 910 does not have to be modified for a one-time change that may expire. Type rules 912 and source rules 914 based on user preferences and/or defaults may provide or factor into the final results. An address book may be used in part, e.g., a user may flag a particular contact so as to always let a notification come through for that contact as if DND was off, regardless of the actual DND level.

Once the appropriate type or types of notification is known, a local notification 920 (or more than one) is given to the user based on the notification rules 906. Note that no notification may be given. If a notification is provided, some configurable amount of time may be given, if appropriate, to allow the user to accept the communication before an outgoing communication 922 based on the outgoing action rules 908 is issued. An outgoing communication may be provided, such as a voice mail recording requesting that a voicemail message may be recorded, and/or an instant message or email sent. The message may be "do not disturb" specific, e.g., to indicate that the user is present but currently in a privacy mode, and suggest an alternative course of action for very important calls/messages.

In addition to a set of rules, notification thresholds and presence may also be adjusted when the "Do Not Disturb" state is in already in effect. A software slider bar, or actuation pattern of the DND button may change the current level, or individual settings. For example, when increasing the level, by default, thresholds may be adjusted up one level and presence is set to indicate "Busy", however this can be customized according to user preferences. A user interface allows the "Do Not Disturb" button to enter a privacy mode that is customizable by user for appropriate visibility, notification and filtering capabilities. For example, a slider bar may set the do not disturb level and bring in various per source and per type settings, with appropriate default levels that may be changed and preserved (e.g., in the database) for each combination, such as by manipulating checkboxes, radio buttons or the like.

As can be readily appreciated, there are any number of user interfaces, types of communications, sources, rules, local notifications and outgoing communications that may be arranged in a given implementation. For example, in one do not disturb state, a user may want the system set such that no calls sound an audible alert except a call from the user's direct boss. Calls that have previously recognized caller ID information may provide a pop-up message and the caller ID information on all calls in which a known caller ID is provided. All other calls are immediately routed to voice mail, and instant messages should be redirected to the auxiliary display instead of popping up on the main display. With the present invention, the user may make selections that alter general rules and/or defaults to provide the desired exceptions, and thereby obtain the appropriate results. A user who is still suffering too many disturbances can dynamically adjust the DND level on demand, or provide additional exceptions.

Figure 10:
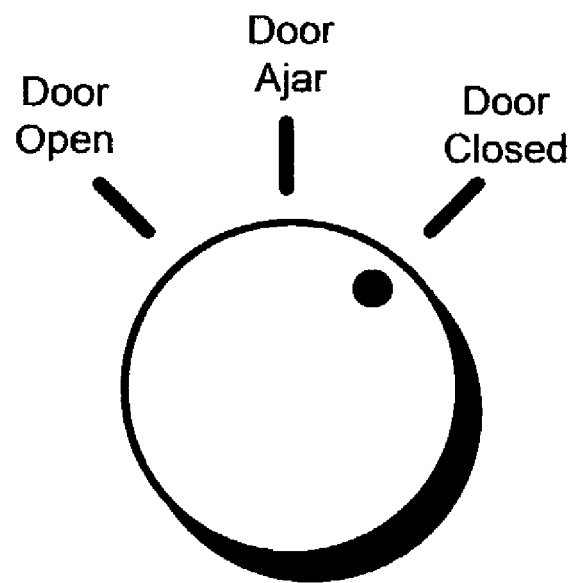
FIG. 10 is a representation of a switch/detector for controlling a do not disturb state in accordance with an aspect of the present invention.

Further, any number of switches and/or mechanisms such as sensors may control the do not disturb state. For example, in FIG. 10, a Multistate DND button/switch equivalent to "door open," "door ajar," and "door closed" literal and physical settings is provided, e.g., as defined by workplace communications protocol. Door sensors or the like can detect and control the do not disturb state.

In addition to the notifying the user and the caller/sender upon a communication, like the DND reminder light for a user, a publicly visible indicator such as a light atop a user's cubicle wall or by an office door may also communicate this do not disturb state to others in advance. Colors and/or flash patterns may be varied to enhance visibility and/or indicate a do not disturb level, e.g., do not disturb at all, do not disturb unless very important, do not disturb unless specific clearance was previously given, and so forth. A broadcast message may be automatically sent to selective others users, such as to notify other members of a work team of a change in a user's do not disturb status (e.g., to or from on or off). Further, do not disturb status may be displayed on another person's workstation (e.g. "busy" in their instant message contact list).

Figure 11:
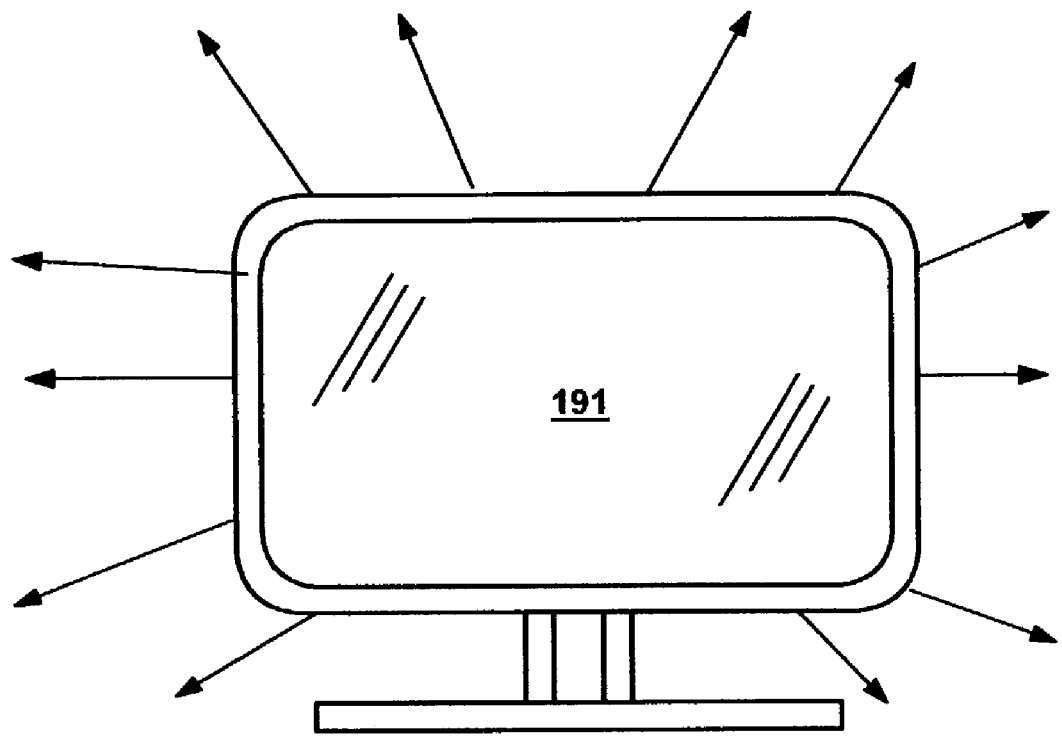
FIG. 11 is a representation of a computer monitor conveying information by emanating light in a generally outward direction.
Figure 12:
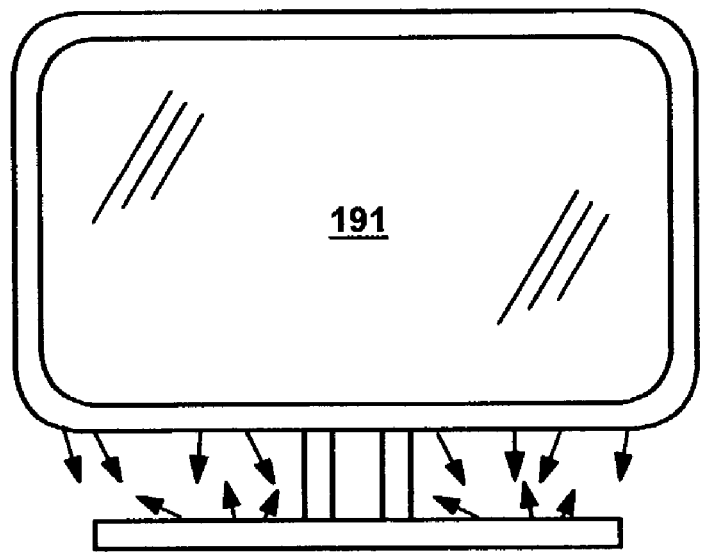
FIG. 12 is a representation of a computer monitor conveying different information relative to FIG. 14 by emanating light in a generally downward direction.
Figure 13:
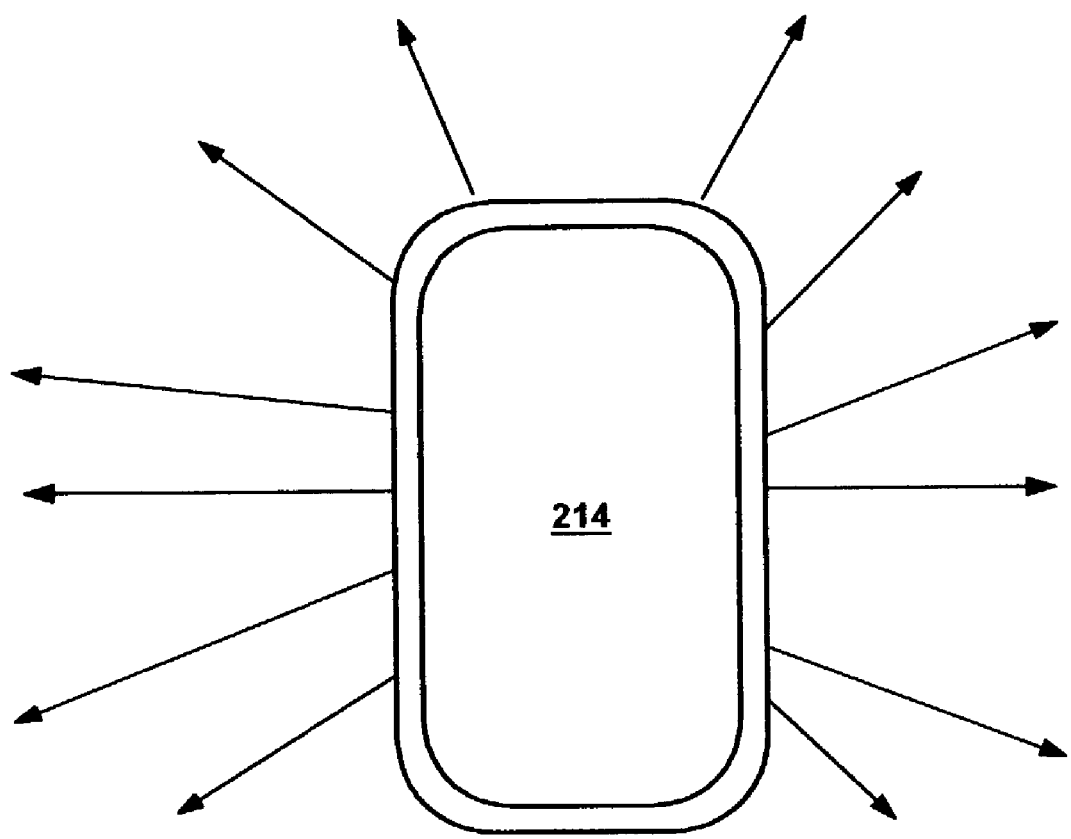
FIG. 13 is a representation of a computer housing conveying information by emanating light in a generally outward direction.

It should be noted that other types of lighting are feasible and may be alternatively implemented. By way of example, as represented in FIG. 11 by the arrows, a light emanating from a computer monitor bezel that is lit when the computer system is in one mode communicates one set of information to a user and others, with respect to another mode in which the light diminishes from around the monitor and emanates from the base of the monitor and/or near the housing, indicating that processing and computing activity has been engaged and that the computer system is on, as in FIG. 12. The general lighting may be different colors, which need not remain constant but can vary over time for attractiveness purposes. The housing 214 can emanate light as in FIG. 13.

This same alternative light source (or sources) can be used (as an alternative or in addition to an LED indicator) to communicate alternative states of computer system use or activity including the do not disturb mode. In this condition, the light emanating from the base may works together with a do not disturb control button to indicate a shift in the way the computer is being used. When so configured, selecting the do not disturb mode causes the light emanating from the base to indicate to the user and other people around the user that the computer is now in a different use state.

Further, other aspects of a user's computing environment may change while in the do not disturb mode relative to other modes. For example a desktop theme or appearance may change, including the computers background, fonts, colors and so forth. Sounds may be different, background music may play, and other noticeable difference may occur as generally selected by the user to remind the user and/or notify others of the do not disturb state of operation.

As can be seen from the foregoing detailed description, there is provided a do not disturb communications method and system in a computer system for intelligently handling the incoming notifications with appropriate outputs in the form of local notifications and/or two-way communications. Users may customize the system and method to adjust for their particular needs. At the same time, a simple actuation of a button or software enters or exits the do not disturb mode, or varies a level of the do not disturb mode. The method and system thus provide significant advantages and benefits needed in contemporary computing and communications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer network including at least one computer system, a method for handling communications comprising:
   providing an interface to a user for setting a do not disturb mode at a computing system, the do not disturb mode being selected from a plurality of levels, the plurality of levels comprising a complete do not disturb level wherein no notification is available and a standard do not disturb level wherein the notification is based on an evaluation a communication source and a communication type;
   receiving input setting a current level of the do not disturb mode from the plurality of levels;
   in response to receiving a communication from a sender of a plurality of available types and sources of communications, performing the acts of;
   evaluating the current level of the do not disturb mode; and
   determining whether a notification is necessary, based at least in part on an evaluation of the communication source, the communication type and the current level of the do not disturb mode, and if a notification is determined to be necessary,
   determining the type of notification, from a plurality of notification types, to output to the user based on the evaluation of the communication source and the current level of the do not disturb mode, and
   outputting a notification to the user that is based on the determined type of notification.

2. The method of claim 1 wherein the received communication type corresponds to a telephone call, wherein the level corresponds to an active state, and wherein outputting a notification to the user based on the determined type of notification comprises generating a visible display without sounding an audible alert.

3. The method of claim 2 wherein generating the visible display comprises lighting an LED.

4. The method of claim 2 wherein generating the visible display comprises providing data to a display.

5. The method of claim 1 wherein the current level corresponds to complete do not disturb level, and further comprising, outputting data to the sender in response to the communication to indicate that the do not disturb mode is in the complete level.

6. The method of claim 5 wherein outputting data in response to the communication comprises playing a voice mail message to the sender.

7. The method of claim 5 wherein outputting data in response to the communication comprises sending an email message to the sender.

8. The method of claim 5 wherein outputting data in response to the communication comprises sending an instant message to the sender.

9. The method of claim 1 wherein the communication type corresponds to a received message, and wherein outputting a notification to the user based on the determined type of notification comprises sending a notification to a main display when the current level is inactive and sending a notification to an auxiliary display when the current level is active.

10. The method of claim 1 further comprising controlling an indicator based on the current level, wherein the indicator indicates to the user the current level of the do not disturb mode.

11. The method of claim 1 further comprising notifying at least one potential sender of a change in the current level of the do not disturb mode prior to receiving a communication from that sender.

12. The method of claim 1 wherein determining the type of notification to output comprises accessing a database based on the communication type and the current level of do not disturb mode.

13. The method of claim 1 wherein determining the type of notification to output comprises accessing a set of communication type rules based on the current level of the do not disturb mode.

14. The method of claim 1 wherein determining the type of notification to output comprises accessing a database based on the source of the received communication and current level of do not disturb mode.

15. The method of claim 14 wherein the source of the received communication corresponds to caller ID data.

16. The method of claim 14 wherein the source of the received communication corresponds to an identity of a sender of a text message.

17. The method of claim 1 wherein determining the type of notification to output comprises accessing a database based on the source of the received communication, the type of received communication and the current level of the do not disturb mode.

18. The method of claim 1 wherein determining the type of notification to output comprises accessing a set of rules based on the source of the received communication, the type of received communication, and the current level of the do not disturb mode.

19. The method of claim 1 wherein outputting a notification comprises using at least one member of a set containing visual, audible, and tactile representations.

20. A computer system comprising:
a processor; and
system memory storing computer-executable instructions which, when executed by the processor, implements the method recited in claim 1.

21. The computer system of claim 20 wherein the interface for setting a do not disturb mechanism comprises an automated process.

22. The computer system of claim 20 wherein the interface for setting a do not disturb mechanism comprises a user-actuated do not disturb button.

23. The computer system of claim 22 wherein the do not disturb button is located on a computer keyboard.

24. The computer system of claim 22 wherein the do not disturb button is located on a control panel.

25. The computer system of claim 22 wherein the do not disturb button is located proximate a display device.

26. The computer system of claim 22 wherein the do not disturb button is grouped with a set of routing control buttons.

27. The computer system of claim 22 further comprising an indicator that outputs information to the user corresponding to the do not disturb state.

28. The computer system of claim 27 wherein the indicator comprises an LED.

29. The computer system of claim 27 wherein the indicator is located proximate the do not disturb button.

30. In a computing environment, a system comprising:
means for receiving a command to set a level, the level being selected from a plurality of available levels, for a do not disturb mode, wherein the plurality of levels comprises a complete do not disturb level wherein no notification is available and a standard do not disturb level wherein the notification is based on an evaluation a communication source and a communication type;
means for activating the do not disturb mode, including providing an indication to a user of the set level of the do not disturb mode;
means for evaluating a received communication relative to level of the do not disturb mode and determining a type of notification to output to the user, from a plurality of notification types, and depending on an evaluation of a source of the received communication and the level of the do not disturb mode; and;
means for outputting a notification to the user based on the evaluation.

31. The method of claim 1 wherein the notification to the user comprises changing a theme in the computing environment of the user.

32. The method of claim 1 wherein the communication type corresponds to a locally generated message.

33. The method of claim 1 wherein the communication type corresponds to a system event.

34. The method of claim 1 wherein the communication type corresponds to an application notice.

35. The computer system of claim 20 wherein the interface for setting a do not disturb mechanism comprises a user input selecting a graphical display object.

36. The computer system of claim 22 wherein the do not disturb button is a selectable graphical display object that is displayed on a display device with the interface.

37. The computer system of claim 35 wherein selection of the graphical display object causes an interface menu to be displayed and which includes the plurality of levels from which the current level of the do not disturb mode is selectable.

38. The method of claim 5 wherein determining the type of notification further comprises an evaluation of the type of communication and wherein the data output to the sender is a type other than the type corresponding to the received communication.

39. The computer system of claim 20 wherein the interface for setting a do not disturb mechanism comprises a sensor which determines the position of a door relative to a doorway located proximate the computer system.

40. The method of claim 38 wherein the type of received communication corresponds to a telephone call and the data output to sender comprises sending the sender a text based message indicating that the user is present but has requested privacy.

* * * * *

UNITED STATES PATENT AND TRADEMARK OFFICE
CERTIFICATE OF CORRECTION

| | | |
|---|---|---|
| PATENT NO. | : 7,443,971 B2 | Page 1 of 1 |
| APPLICATION NO. | : 10/429903 | |
| DATED | : October 28, 2008 | |
| INVENTOR(S) | : Eric Gould Bear et al. | |

It is certified that error appears in the above-identified patent and that said Letters Patent is hereby corrected as shown below:

In column 14, line 23, in Claim 5, after "corresponds to" insert -- a --.

In column 14, line 26, in Claim 5, delete "comp1ete" and insert -- complete --, therefor.

Signed and Sealed this
Twenty-sixth Day of April, 2011

David J. Kappos
*Director of the United States Patent and Trademark Office*